(12) United States Patent
Jin et al.

(10) Patent No.: US 9,806,352 B2
(45) Date of Patent: Oct. 31, 2017

(54) FUEL CELL

(71) Applicant: Hyundai Motor Company, Seoul (KR)

(72) Inventors: Sang Mun Jin, Gyeonggi-Do (KR); Yoo Chang Yang, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 24 days.

(21) Appl. No.: 14/548,759

(22) Filed: Nov. 20, 2014

(65) Prior Publication Data

US 2015/0364774 A1 Dec. 17, 2015

(30) Foreign Application Priority Data

Jun. 12, 2014 (KR) ........................ 10-2014-0071238

(51) Int. Cl.
*H01M 8/02* (2016.01)
*H01M 8/0258* (2016.01)
*H01M 8/026* (2016.01)
*H01M 8/0271* (2016.01)
*H01M 8/0247* (2016.01)
*H01M 8/1004* (2016.01)

(52) U.S. Cl.
CPC ......... *H01M 8/0258* (2013.01); *H01M 8/026* (2013.01); *H01M 8/0247* (2013.01); *H01M 8/0271* (2013.01); *H01M 8/1004* (2013.01)

(58) Field of Classification Search
CPC . H01M 8/0258; H01M 8/0247; H01M 8/1004
USPC ........................................................ 429/505
See application file for complete search history.

(56) References Cited

U.S. PATENT DOCUMENTS

2005/0164071 A1* 7/2005 Horiguchi ........... H01M 8/0228
429/450
2007/0269697 A1 11/2007 Randon et al.

FOREIGN PATENT DOCUMENTS

| JP | H04-322062 A | 11/1992 | |
|---|---|---|---|
| JP | 08-001806 B | * 1/1996 | ............. H01M 8/02 |
| JP | 2004-171824 A | 6/2004 | |
| JP | 2009-037759 A | 2/2009 | |
| JP | 2013-004458 A | 1/2013 | |
| JP | 2013-093099 A | 5/2013 | |
| KR | 10-0801430 B1 | 2/2008 | |

* cited by examiner

*Primary Examiner* — Victoria Lynch
(74) *Attorney, Agent, or Firm* — Mintz Levin Cohn Ferris Glovsky and Popeo, P.C.; Peter F. Corless

(57) ABSTRACT

A fuel cell is provided which includes a catalyst layer to which hydrogen gas or air are introduced through both surfaces thereof a first separator disposed at a first side of the catalyst layer and including a plurality of first channels such that a first reactant among hydrogen gas or air flows; and a second separator disposed at the second side of the catalyst layer and including a plurality of second channels disposed in a direction perpendicular to the first channels. Particularly, each of the second channels includes a plurality of ventilation apertures such that a second reactant among the hydrogen and the air flows in a direction perpendicular to the second channels.

7 Claims, 3 Drawing Sheets

FUEL CELL

CROSS REFERENCE TO RELATED APPLICATION

The present application claims priority to Korean Patent Application No. 10-2014-0071238, filed Jun. 12, 2014, the entire contents of which is incorporated herein for all purposes by this reference.

TECHNICAL FIELD

The present invention relates to a fuel cell, and more particularly, to a fuel cell capable of improving diffusion of a reaction gas and more creating a more uniform surface pressure of a reaction surface by changing a passage structure of a fuel cell separator.

BACKGROUND

Typically, a metal separator is applied to a fuel cell, the metal separator has channels for a reactant and cooling water, a pair of gas diffusion layers (GDL) 12 for facilitating the diffusion of the reactant, and a membrane electrode assembly (MEA) 11 in which a chemical reaction occurs and which is positioned between the pair of gas diffusion layers (GDLs) 12. In the metal separator, channel parts 41 in which the reaction gas flows in the same direction as a flow direction of the reaction gas and land parts 42 which are in contact with the GDLs 12 are repeatedly formed, and passages of an anode separator 30 and a cathode separator 20 are symmetrical to each other, such that a space between the anode separator 30 and the cathode separator 20 is used as a cooling passage, as shown in FIG. 1.

In addition, to maximize performance of the fuel cell, a channel pitch of the separators 20 and 30 may be required to be dense to improve surface pressure to the GDL 12 and MEA 11, and then, the GDL 12 may be able to have constant permeability over an entire reaction surface. However, reducing the channel pitch of the separators 20 and 30 may be limited due to a defect such as crack or spring-back occurring during manufacturing, and the other performance deterioration factors may occur due to such defects.

For example, diffusion of reaction gas and discharging properties of produced water may deteriorate. When the channel pitch is substantially large, stress may be concentrated on the land part 42 in which the separator and the GDL 12 contact each other, such that surface pressure may not be applied sufficiently uniformly. Therefore, a porous structure of the GDL 12 may be destroyed, such that permeability of the GDL 12 may deteriorate and diffusion of the reaction gas and a discharging property of produced water may deteriorate. Further, when stress is reduced in the channel part 41, the GDL 12 may permeate into the channel part 41 to deteriorate a fluidity of the reactant flow.

In addition, membrane damage may occur when the land part 42 in which the structure of the GDL 12 is destroyed, carbon fibers may permeate into a membrane thereby damaging the membrane. Moreover, non-uniformity of electrical conductivity may occur. In the channel part 41 in which the GDL 12 is exposed, the reaction gas may be smoothly supplied, to cause an active chemical reaction. However, when surface pressure between the GDL 12 and the MEA 11 is insufficient, a contact resistance may increase, thereby inhibiting movement of electrons generated by a reaction.

The matters described as the related art have been provided only for assisting in the understanding for the background of the present invention and should not be considered as corresponding to the related art known to those skilled in the art.

SUMMARY

In one aspect, the present invention provides a fuel cell in which a channel is formed in a direction perpendicular to a flow direction of a reaction gas; opening parts penetrating through each channel formed at regular intervals in wall surfaces of the channels to form flow paths of the reaction gas; and separators that correspond to an anode and a cathode may be formed in each channel to overlap with each other.

According to an exemplary embodiment of the present invention, provided is a fuel cell which may include: a catalyst layer having hydrogen gas or air introduced thereinto through both surfaces thereof; a first separator disposed at a first side of the catalyst layer and including a plurality of first channels to allow a first reactant among the hydrogen gas and the air to flow; and a second separator disposed at a second side of the catalyst layer and including a plurality of second channels disposed in a direction perpendicular to the first channels. In particular, each of the second channels may include a plurality of ventilation apertures to allow a second reactant among the hydrogen gas and the air to flow in a direction perpendicular to the second channels.

The first separator and the second separator may be bent in a zigzag shape, and end portions thereof may be formed on first side surfaces thereof, respectively, and the bent portions may contact the catalyst layer to form closed loops between the respective separators and the catalyst layer, thereby generating the first and second channels. The ventilation apertures may be formed in inclined surfaces of the second separator connecting a first end and a second end of the second separator that are bent and the ventilation apertures may be formed at predetermined intervals along a longitudinal side of the second channel.

The ventilation apertures formed in any one of a plurality of inclined surfaces may be alternatively arranged with the ventilation apertures formed in an inclined surface adjacent to any one of the inclined surfaces. Each of the ventilation apertures formed in any one of a plurality of inclined surfaces may be formed at a position that corresponds to a substantially central portion between two ventilation apertures formed in the inclined surface adjacent to any one of the inclined surfaces.

The fuel cell may further include an air-tight panel covering the second side surface of at least any one of the first separator and the second separator. A contact area between the first side surface of the first separator and the catalyst layer may be greater than a contact area between the second side surface of the first separator and the air-tight panel.

DESCRIPTION OF DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a fuel cell according to an exemplary embodiment of the present invention will be described with reference to the accompanying drawings.

Figure 1:
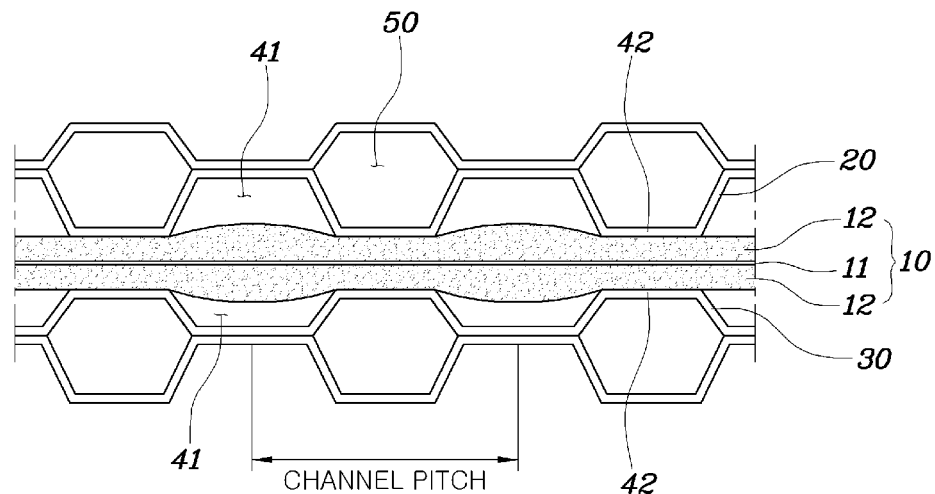
FIG. 1 shows a structure of an exemplary fuel cell in the related art.
Figure 2:
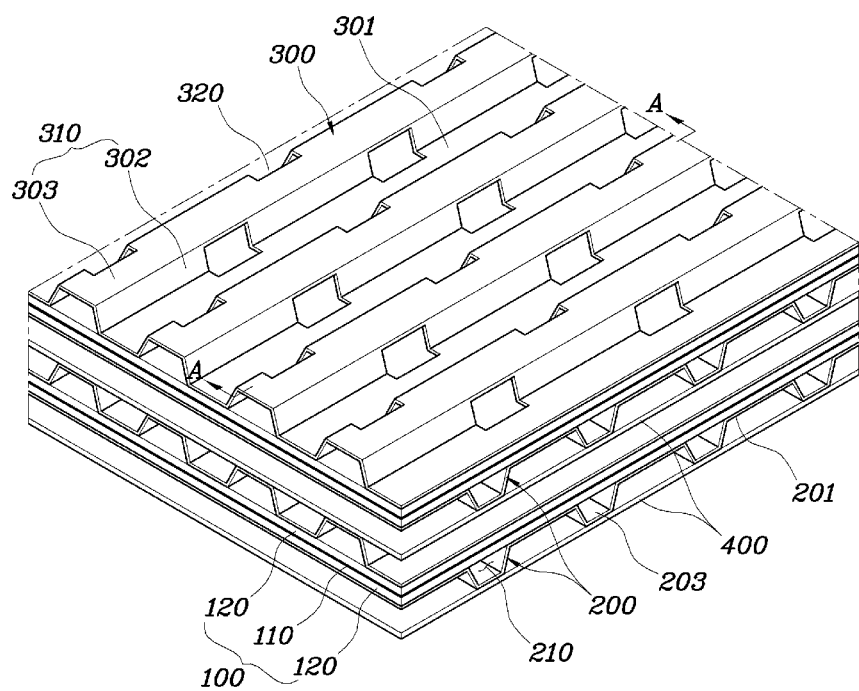
FIG. 2 shows a configuration of an exemplary fuel cell according to an exemplary embodiment of the present invention.

FIG. 2 illustrates an exemplary fuel cell according to an exemplary embodiment of the present invention. The fuel cell may be configured to include: a catalyst layer 100 having hydrogen gas or air introduced thereinto through both surfaces thereof; a first separator 200 disposed at a first side of the catalyst layer 100 and including a plurality of first channels 210 such that a first reactant among the hydrogen gas or the air may flow; and a second separator 300 disposed at a second side of the catalyst layer 100 and including a plurality of second channels 310 disposed in a direction perpendicular to the first channels 210. In particular, each of the second channels 310 may include a plurality of ventilation apertures 320 such that a second reactant among the hydrogen and the air may flow in a direction perpendicular to the second channels 310. The first reactant may be different from the second reactant.

In addition, cross sections of the first separator 200 and the second separator 300 may be bent in a zigzag shape to form bent first ends 201 and 301 and second ends 203 and 303, respectively, a first side surfaces of the first separator 200 and a second separator 300 may contact the catalyst layer 100, and the first ends 201 and 301 that are bent may contact the catalyst layer 100 to form closed loops between the respective separators 200 and 300 and the catalyst layer 100, thereby forming the first and second channels 210 and 310.

Further, the catalyst layer 100 may be an assembly formed of a membrane electrode assembly (MEA) 110 of the fuel cell and a pair of gas diffusion layers (GDLs) bonded to both surfaces of the membrane electrode assembly, as shown in FIG. 2. Particularly, the first and second channels 210 and 310 may contact outer surfaces of the gas diffusion layers 120. The hydrogen gas may flow in the first channels 210 as the first reactant, and oxygen gas may flow in the second channels 310 as the second reactant. Without bound to certain examples, materials or reactants flowing in the first and second channels 210 and 310 may be changed depending on various embodiments of the invention.

The first and second channels 210 and 310 may be arranged to overlap with each other, such that uniform surface pressure may be applied to the catalyst layer 100 and stress on a contact surface may be dispersed to prevent concentration of the stress, thereby preventing damage to the catalyst layer 100 and deterioration of reactivity. The ventilation aperture 320 may be formed in the inclined surfaces of the second separator 300 connecting the first end 301 and the second end 303 of the second separator 300 that are bent to each other. The ventilation aperture may be formed at predetermined intervals along a longitudinal side of the second channel 310. The ventilation apertures 320 formed in any one of a plurality of inclined surfaces 302 may be alternatively arranged with the ventilation apertures 320 formed in an inclined surface 302 adjacent to any one of the inclined surface 302.

Figure 3:
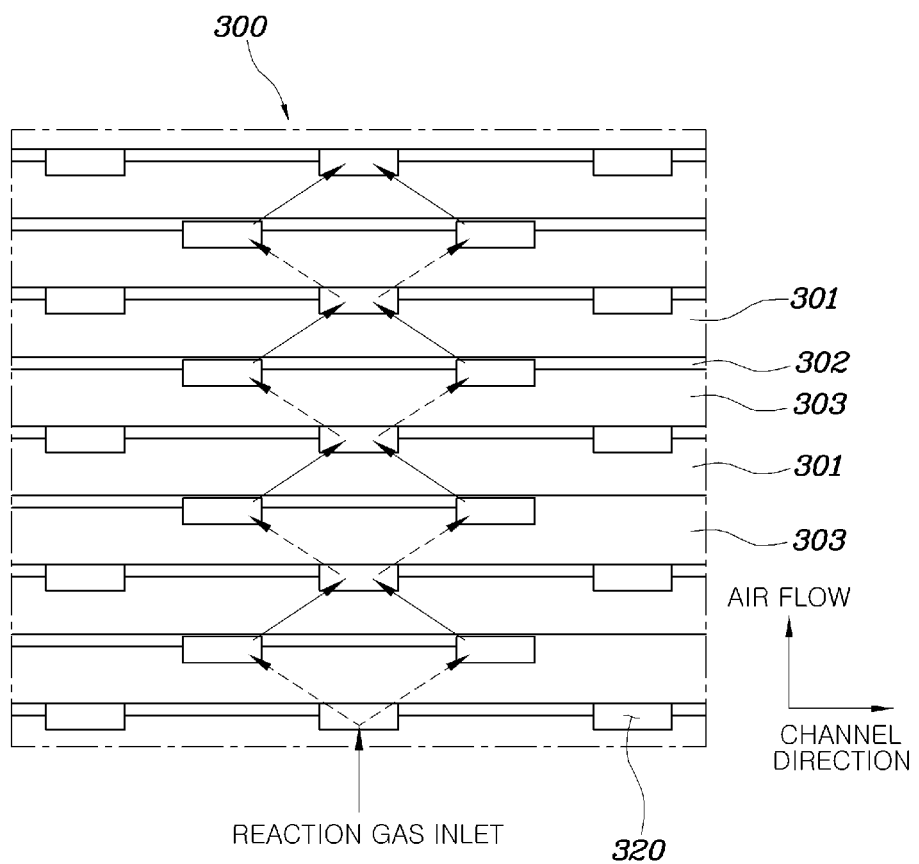
FIG. 3 shows a fluid flow of an exemplary fuel cell according to an exemplary embodiment of the present invention.

FIG. 3 shows a fluid flow of an exemplary fuel cell according to an exemplary embodiment of the present invention and is a top view of FIG. 2. The hydrogen gas or the oxygen gas may be introduced into any one of the plurality of ventilation apertures 320, the introduced hydrogen gas or oxygen gas may be introduced into the respective second channels 310 or spaces between the second channels 310. The introduced hydrogen gas or oxygen gas may be introduced repeatedly into the spaces between the second channels 310 and the respective second channels 310 through the ventilation apertures 320.

The introduced hydrogen gas or oxygen gas may move in a direction perpendicular to a longitudinal direction of the second channels 310, that is, in a direction that is in parallel with a length direction of the first channels 210, through the ventilation apertures 320 and may move by a predetermined section within the second channels 310, since the respective ventilation apertures 320 are disposed at predetermined intervals and are arranged alternatively with the ventilation apertures 320 formed in the inclined surface 302 adjacent thereto. As consequence, a reaction area and time with the catalyst layer 100 may increase. Further, increased diffusion of the hydrogen gas or the oxygen gas may improve reaction efficiency to the introduced hydrogen gas or oxygen gas.

Particularly, each of the ventilation apertures 320 formed in any one of the plurality of inclined surfaces 302 may be formed at a position that corresponds to a substantially central portion between two ventilation apertures 320 formed in the inclined surface 302 adjacent to any one of the inclined surface 302. Since the introduced hydrogen gas or air may make distances between the ventilation apertures 320 equal to each other with respect to all of the ventilation apertures 320 as the gases are moving through the plurality of ventilation apertures 320, uniformity of diffusion may be maintained and uniform reactivity may be induced over the entire catalyst layer 100.

Figure 5:
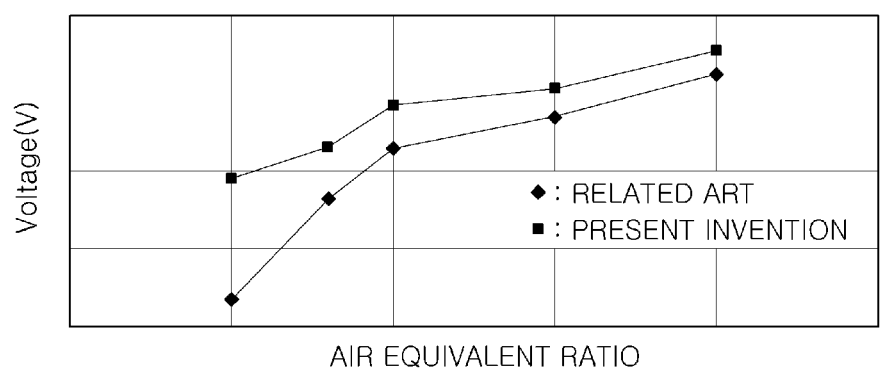
FIG. 5 shows output voltages according to an air equivalent ratio of the fuel cell according to an exemplary embodiment of the present invention and the fuel cell in the related art.

An effect of the diffusion of the fuel cell separator in the present invention may be clearly shown in FIG. 5. FIG. 5 shows a graph which includes diffusion of introduced air when the air is introduced into the second channels 310 and output voltages according to an amount of supplied air in the related art and in an exemplary embodiment of the invention. Since diffusion of the reaction gas in an exemplary fuel cell of the present invention may be improved and thus a fluidity of fuel supplied into the fuel cell, performance may not be reduced even though a reduced amount of fuel is supplied. Furthermore, as shown in FIG. 5, although an air equivalent ratio is decreased, a decrease width in a voltage output from the fuel cell according to an exemplary embodiment of the present invention may be less than that of the fuel cell in the related art. Thus, diffusion of the reaction gas in the present invention may be improved.

Meanwhile, as shown in FIG. 2, the fuel cell according to an exemplary embodiment of the present invention may further include an air-tight panel 400 that covers the second side surface of at least any one of the first separator 200 and the second separator 300. The air-tight panel 400 may contact the second side surface of the first separator 200 or the second separator 300, in particular, the bent second end 203 or 303. Accordingly, closed loops may be formed in a space between the first separator 200 and the air-tight panel 400 and a space between the second separator 300 and the air-tight panel 400, thereby forming a path for a coolant to flow in spaces between the first channels 210 but prevent the coolant from being introduced into the spaces between the second channels 310.

The air-tight panel 400 may be provided on any one of the second side surface of the first separator 200 and the second side surface of the second separator 300. The air-tight panel 200 may be configured such that the second side surface of the first separator 200 may contact the first side surface of the air-tight panel 400 and the second side surface of the second separator 300 may contact the second side surface of the air-tight panel 400 when a plurality of fuel cells are stacked. Alternatively, the air-tight panels 400 may be disposed on the second side surfaces of the first separator 200 and the second separator 300, respectively, such that they may contact each other when the plurality of fuel cells are stacked.

Assembly of the catalyst layer 100, the first separator 200, the second separator 300, and the air-tight panel 400 described above may be pressed by external force, such that they may be maintained in a close contact, and further may be entirely or partially bonded to each other, such that the fuel cell may be formed integrally with the catalyst layer 100, the first separator 200, the second separator 300, and the air-tight panel 400. Various bonding methods such as a welding method, an adhering method, a bolting method, a riveting method, and the like, may be used for bonding the components.

Figure 4:
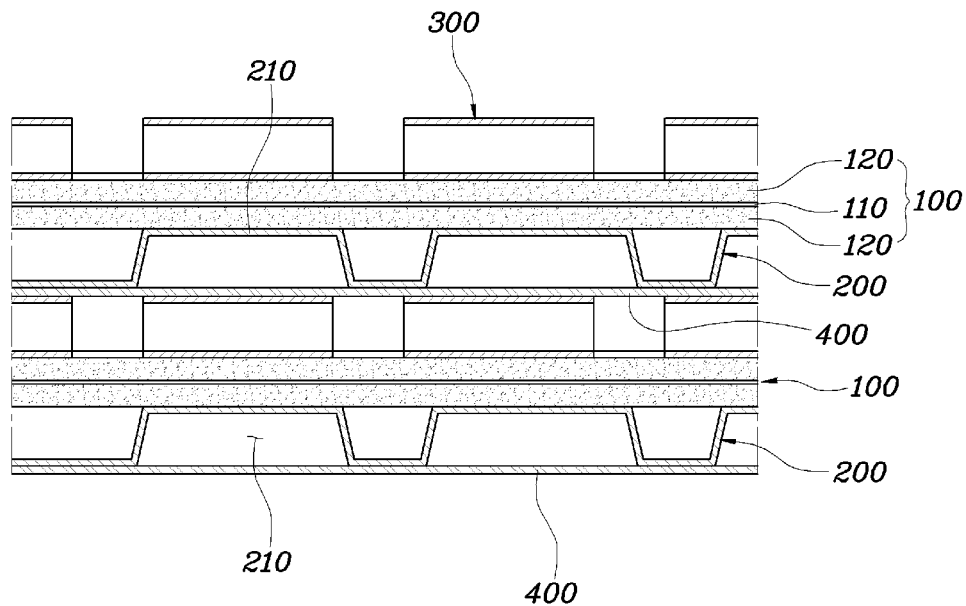
FIG. 4 is a cross-sectional view of an exemplary fuel cell according to an exemplary embodiment of the present invention.

FIG. 4 shows a cross-sectional view of an exemplary fuel cell taken along line A-A of FIG. 2. In particular, a contact area between the first side surface of the first separator 200 and the catalyst layer 100 may be greater than a contact area between the second side surface of first separator 200 and the air-tight panel 400, as shown in FIG. 4. Meanwhile, the second separator 300 may have a structure in which a coolant may not flow since inner and outer portions of the second channels 310 may be in communication with each other due to the plurality of ventilation apertures 320. Accordingly, in to compromise limited flow of the coolant, sizes of passages through which the coolant flows may be increased. Therefore, the contact area between the first side surface of the first separator 200 and the catalyst layer 100 may be configured to be greater than the contact area between the second side surface of the first separator 200 and the air-tight panel 400 to increase an amount of the coolant flowing in the space between the first separator 200 and the air-tight panel 400 and increase an area of the catalyst layer 100 supported by one separator 200, thereby more uniformly applying surface pressure to the catalyst layer 100.

According to various exemplary embodiments of the fuel cell having the structure as described above, the surface pressure applied on the catalyst layer 100 may increase and the diffusion of the reaction gas may be improved, thereby improving performance of the fuel cell. In addition, the first and second channels 210 and 310 may be arranged perpendicularly to each other, thereby improving structural stability of the fuel cell.

Although the present invention has been shown and described with respect to various exemplary embodiments, it will be obvious to those skilled in the art that the present invention may be variously modified and altered without departing from the spirit and scope of the present invention as defined by the following claims.

What is claimed is:

1. A fuel cell, comprising:
   a catalyst layer having hydrogen gas or air introduced thereinto through a first surface and a second surface thereof;
   a first separator disposed at a first side of the catalyst layer and including a plurality of first channels such that a first reactant among the hydrogen gas and the air flows; and
   a second separator disposed at a second side of the catalyst layer and including a plurality of second channels disposed in a direction perpendicular to the first channels,
   wherein each of the second channels includes a plurality of ventilation apertures such that a second reactant among the hydrogen gas and the air flows in a direction perpendicular to the second channels, and
   wherein the second reactant among the hydrogen gas and the air flows in parallel with a length direction of the first channels through the ventilation apertures.

2. The fuel cell of claim 1, wherein the first separator and the second separator are bent in a zigzag shape, and first and second end portions that are formed on a first side surfaces thereof, respectively, and are bent to contact the catalyst layer to form closed loops between the first and second separators and the catalyst layer, thereby forming the first and second channels.

3. The fuel cell of claim 2, wherein the ventilation apertures are formed in inclined surfaces of the second separator connecting a first end and a second end of the second separator that are bent to each other and are formed at predetermined intervals on a longitudinal side of the second channel.

4. The fuel cell of claim 3, wherein the ventilation apertures formed in any one of the plurality of inclined surfaces are alternatively arranged with the ventilation apertures formed in an inclined surface adjacent to any one of the inclined surface.

5. The fuel cell of claim 3, wherein each of the ventilation apertures formed in any one of the plurality of inclined surfaces is formed at a position that corresponds to a substantially central portion between two ventilation apertures formed in an inclined surface adjacent to any one of the inclined surface.

6. The fuel cell of claim 2, further comprising an air-tight panel that covers a second side surface of at least any one of the first separator and the second separator.

7. The fuel cell of claim 6, wherein a contact area between a first side surface of the first separator and the catalyst layer is greater than a contact area between the second side surface of the first separator and the air-tight panel.

* * * * *